Nov. 17, 1931.  R. W. CLIFFORD  1,832,279
VALVE
Filed Sept. 6, 1929
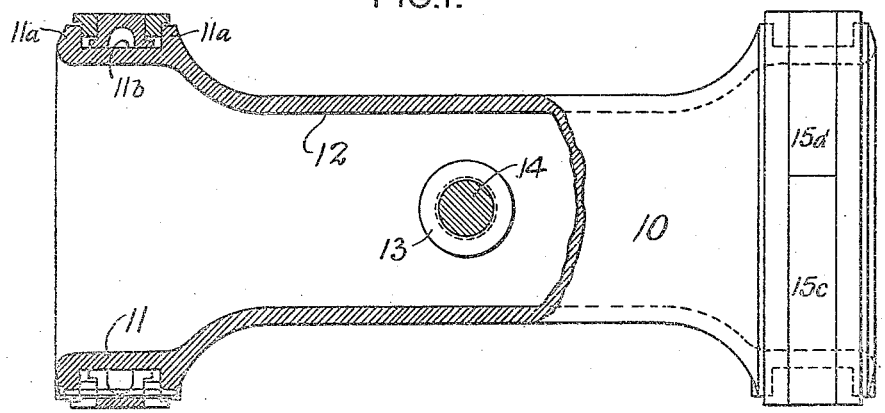
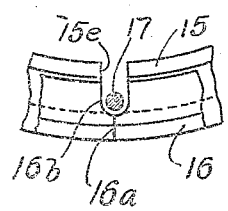
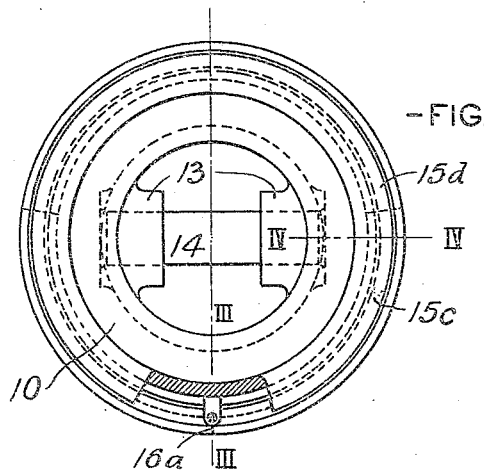
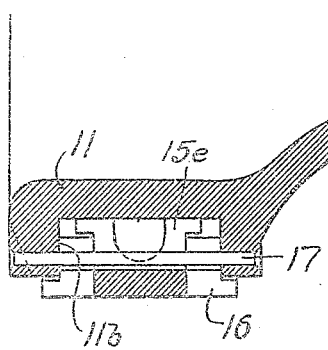
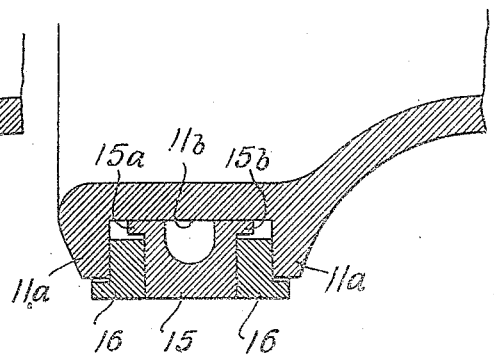
INVENTOR
Roger W. Clifford.
BY  S. C. Seaton
ATTORNEY Patented Nov. 17, 1931

1,832,279

UNITED STATES PATENT OFFICE

ROGER W. CLIFFORD, OF SCHENECTADY, NEW YORK

VALVE

Application filed September 6, 1929. Serial No. 390,676.

This invention relates generally to valves and valve parts, and is especially useful in piston distribution valves.

The piston valves of usual practice, embody two separately formed follower rings with spiders, one at each end of the valve, and the valve rod extends entirely through the piston element and is provided with a shoulder which abuts one of the followers, and a nut which abuts the other follower. Such constructions, because of their excessive weight, produce rapid wearing of the packing and bull rings, the valve bushing, and the operating gear, and because of the large number of parts which must be machined and assembled, entail a high production cost.

An object of the present invention is to provide a piston distribution valve, which has fewer parts, which is of less weight, which is more efficient, and which is more economical to manufacture, assemble, and maintain than the piston valves heretofore known. The invention is especially advantageous in distribution valves for high speed engines, such as locomotives, as the substantial reduction effected in the weight of the valve, lessens materially the inertia stresses, and the consequent wear on the valve gear at high speeds.

In the accompanying drawings: Figure 1 is a view, partly in longitudinal central vertical section, and partly in side elevation of a piston valve embodying the invention; Fig. 2, an end view, with a portion of the outer flange of the ring groove broken away, of the construction shown in Fig. 1; Fig. 3, a fragmentary transverse vertical section, on an enlarged scale, taken on the line III—III of Fig. 2; Fig. 4, a fragmentary transverse vertical section, on an enlarged scale, taken on the line IV—IV of Fig. 2; and, Fig. 5, an enlarged fragmentary view showing details of the construction for preventing the packing and bull rings from rotating.

In the practice of the invention, referring descriptively to the specific embodiment thereof which is herein exemplified, the piston valve embodies a tubular casting, 10, having a cylindrical piston portion, 11, at each end; a cylindrical body portion, 12, of less diameter than the piston portions, and connecting the same; and spaced bosses, 13, for the reception of a pin, 14, adapted to connect the valve to the end of a valve rod (not shown). Each piston portion is formed with inner and outer circular flanges, 11a, to provide a circumferential groove, 11b, for the reception of a bull ring, 15, and two split packing rings, 16.

The bull rings, which serve to seal the splits in the packing rings and to carry the weight of the valve, are substantially T-shape in cross section, having two lateral circumferential flanges, 15a and 15b. Each ring preferably comprises a bottom section, 15c, and an upper section, 15d. The lower section is made greater than 180° of a circle, so that it will grip the bottom of the groove, 11b, to facilitate assembling of the valve, and prevent separation of the ends of the ring segments when the bottom section becomes worn.

The packing rings, 16, are L-shape in cross section, and split at 16a. To prevent the split in the packing rings being brought into register with the splits in the bull ring, a pin, 17, is provided for each piston portion to prevent relative turning of the rings. Each pin passes through bores in the piston flanges, 11a, grooves, 16b, in the packing rings, and a groove, 15e, in the lower section of the bull ring.

In assembling the rings in the grooves, the inner packing ring is first applied, the bull ring is next applied, its flange, 15b, being slipped under the inner packing ring, the outer packing ring is then applied. As the packing rings are made of sufficiently large cross section to withstand steam pressure, they would be permanently distorted if spread to pass over the bull ring. To avoid such spreading, the present invention provides a construction which enables the packing rings to be assembled by spreading them only a sufficient amount to clear the outer piston flanges.

It will readily be appreciated that the improved construction effects a material reduction in weight, machine work, and number of parts, over the old construction hereinbefore described. Although the improved construction has been described as embodied in a piston distribution valve, it is to be understood that it is applicable to piston structures generally.

While one of the preferred forms of construction has been shown, it is obvious that many variations in procedure, form, arrangement and construction of the parts can be made, and the invention is not therefore limited to the particular embodiment disclosed, but includes such changes and modifications as come within the spirit and scope of the invention as set forth in the appended claims.

The invention claimed and desired to be secured by Letters Patent is:

1. The combination of a grooved piston for valves and the like, having an integrally formed flange comprising the outer end wall of the groove; and a transversely divided, resilient sectional bull ring having one of its sections greater than 180° of the ring and one of its sections less than 180° of the ring, said greater ring section defining a gap between its ends that may be spread within the elastic limits of the ring to a sufficient extent for mounting said section over said groove in assembling the section, said ring sections resting against the bottom of the piston groove.

2. The combination of a grooved piston for valves and the like, having an integrally formed flange comprising the outer end wall of the groove; and a transversely divided, resilient sectional bull ring substantially T-shaped in cross-section, the head of the T being at the inner periphery of the ring and resting on the bottom of the piston groove, one section of the ring being greater than 180° thereof and one section of the ring being less than 180° thereof, and said greater ring section defining a gap between its ends that may be spread within the elastic limits of the ring to a sufficient extent for mounting said section over the groove in assembling the same.

ROGER W. CLIFFORD.